United States Patent Office 2,892,151
Patented June 23, 1959

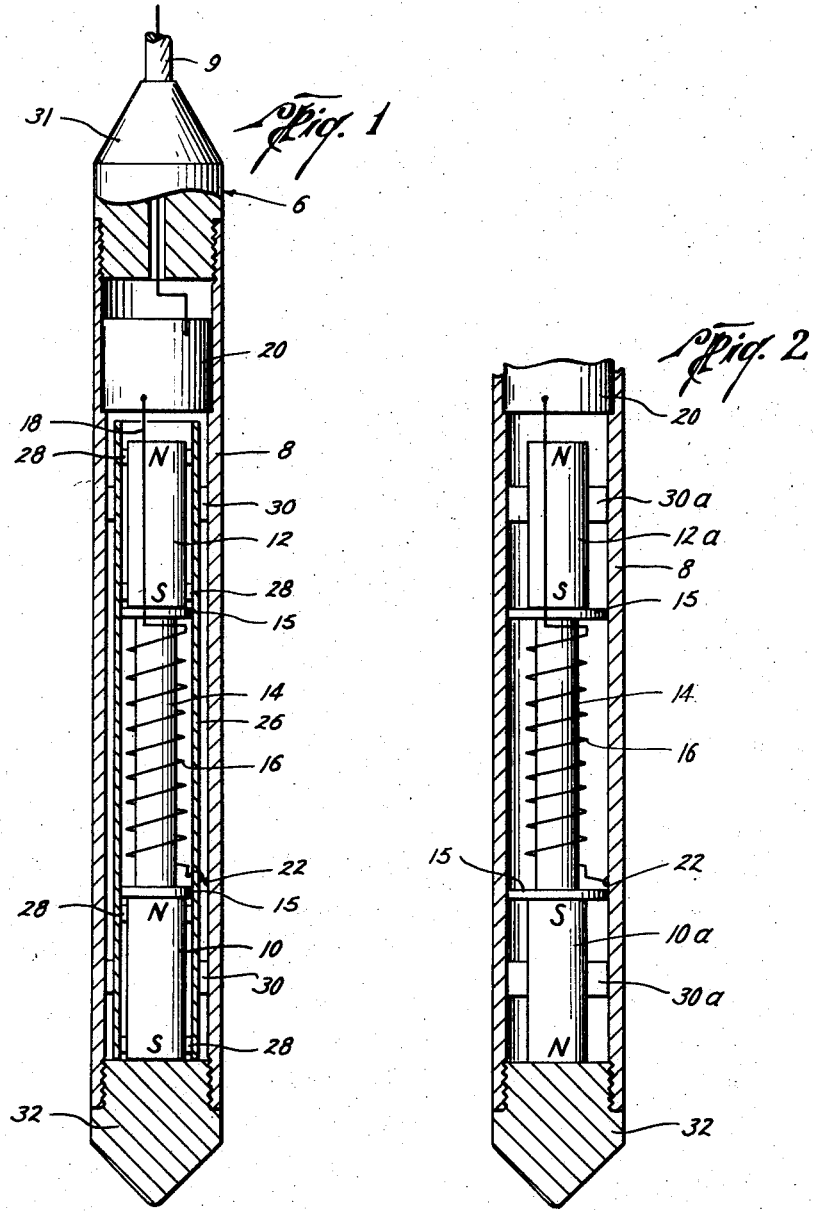

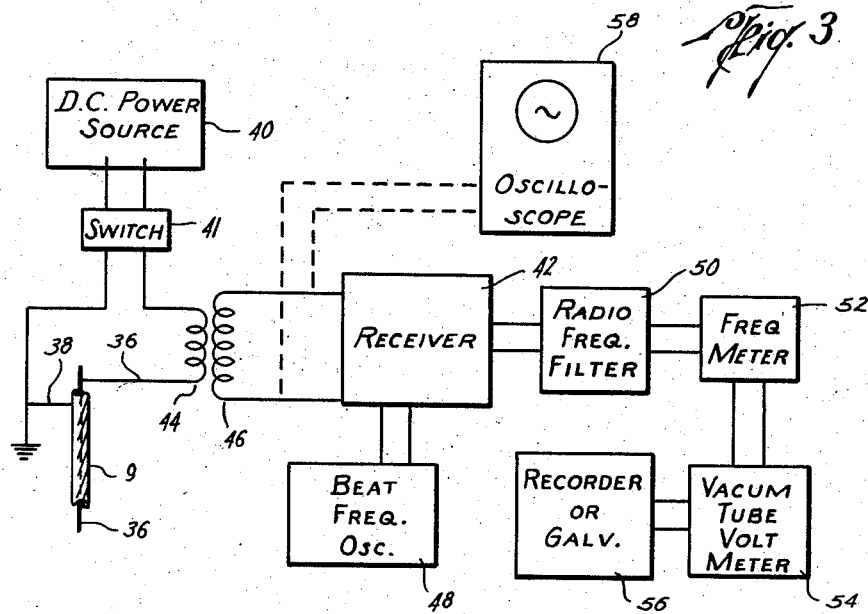
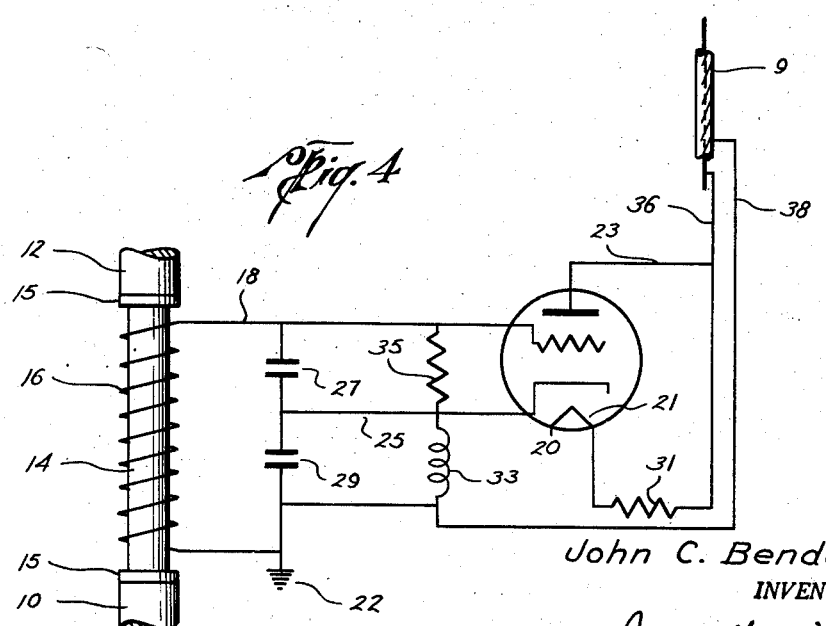

2,892,151

APPARATUS FOR LOCATING ANOMALIES IN A WELL BORE

John Carlos Bender, Houston, Tex., assignor to Houston Oil Field Material Company, Inc., Houston, Tex., a corporation of Delaware Application August 10, 1953, Serial No. 373,271

7 Claims. (Cl. 324—41)

This invention relates to an apparatus for locating metallic objects lost in a well bore.

In the drilling of wells and, particularly in the drilling of wells for petroleum products, pieces of pipe, drill stems, tools and the like, many times become lost in the well bore and it is desirable to locate them accurately so that they can readily be removed. Several attempts have been to provide a method of and apparatus for locating these lost pieces of metal, but none of them have been entirely satisfactory for various reasons. For example, electronic or electric "fish locaters" fall generally in either the resistance logging field or in the propagated wave field. In fishing for lost objects in oil wells it is exceedingly important to locate the top of the object, generally called a "fish" in the trade, as exactly as possible so that appropriate fishing instruments and procedures may be utilized in successfully removing the lost object. The resistive method has the disadvantage of producing a broad recording, which, while it shows the presence of the lost fish, it does not indicate definitely the top of the lost fish so that successful fishing operations may be accomplished or facilitated. The electromagnetic methods definitely locate the top of the fish only when the fish is in very close proximity to the electrode, such as about 18 inches of the electrode in better electromagnetic instruments. Thus, as a practical matter in many cases, it is not possible to locate exactly the top of the fish when utilizing electromagnetic methods and instruments.

The present invention is advantageous in that the position of the top may be located accurately when the apparatus is some distance from the lost object, thereby facilitating successful fishing operations.

It is, therefore, an object of the present invention to provide an improved means for locating metallic objects in well bores in which the top of the lost object is located accurately.

A further object of the present invention is the provision of an apparatus for locating accurately the top of lost metallic objects in the well bore readily and inexpensively.

Yet a further object of the present invention is the provision of an apparatus for locating metallic objects in a well bore in which the apparatus utilized has no external coils but is completely enclosed in a nonmagnetic housing and which indicates the exact position of ferrous metal a considerable distance, such as twelve to fifteen feet away, from the instrument.

Yet a further object of the present invention is the provision of an apparatus for locating accurately relatively small bits of metal such as cones, or parts of cones, left in the hole after performing fishing operations, such as fishing with junk baskets.

The present invention is based upon the effect of disturbances or distortion of a strong magnetic field by the presence of one or more lost metallic objects. The field is produced by powerful permanent magnets in which field is provided an oscillator coil about a core of easily saturable ferromagnetic material of high permeability with a winding to which is applied an oscillating voltage that produces a magnetic field that drives the core cyclically through saturation. When the permeability of the core is high, the flux density produced in it by the external field of permanent magnets is an appreciable part of the flux density at or near saturation. Owing to this effect of the core, the output electromagnetomotive force of the coil is distorted upon the distortion of the external magnetic field of the permanent magnets, which distortion is indicated or measured at the surface of the ground and provides, therefore, a means of indicating slight changes or distortions in the external magnetic field produced by the permanent magnets and caused by metal objects and hence the location and position of the top of the object. The indication or measurement of the distortion at the surface may be done in any convenient manner; however, satisfactory results have been obtained by heterodyning the frequency of the oscillator with a second oscillator or a beat oscillator and the changes in frequency from the oscillator circuit may readily be read by conventional instruments. Preferably, the core should be saturated or nearly saturated, or should be on the steep portion of the hysteresis curve so that the least change in the magnitude of the magnetic field will be indicated. Also, it is preferred to use strong magnets to provide a strong magnetic field which increases the sensitivity of the oscillator.

It is, therefore, a further object of the present invention to provide means for locating the position of metal objects in well bores which include a core of easily saturable ferromagnetic material of high permeability having an external winding to which is applied an oscillating voltage producing a magnetic field driving the core cyclically through saturation, and include means to provide an external magnetic field which also is applied to the core, which external magnetic field adds to the total field whereby distortion of the external magnetic field will distort the output electromagnetomotive force of the coil, which distortion is read at the surface to indicate the presence and exact location of such metal objects.

It is yet a further object of the present invention to provide a means for locating accurately the presence and position of metal objects in a well bore by moving in the well bore a core of easily saturable ferromagnetic material of high permeability to which is applied an oscillating voltage that produces a magnetic field that drives the core cyclically through saturation, and providing an external magnetic field which is moved with the core and applied to the core so that distortion of the external magnetic field by metal objects in the well bore distorts the total field of the core thereby effecting the output electromagnetomotive force of the coil and instrumentally measuring such distortion at the surface to indicate the presence and exact location of the metal objects.

The present apparatus is particularly, but not necessarily, suitable for locating and determining the position of metallic objects in a well bore, and, accordingly, the description of the invention is directed toward that adaptation. However, the apparatus of the present invention can be used for the location of metallic objects other than in well bores and for other uses which will readily suggest themselves to those skilled in the art.

The accomplishment of the above and other objects will be apparent to those skilled in the art from the following description of an apparatus constructed according to the invention when taken in connection with the accompanying drawings, where like references refer to like parts throughout the several views and where Figure 1 is an elevation, partly in section, of a probe unit of an apparatus constructed according to the invention, Figure 2 is a fragmentary view of a modification of a probe unit constructed according to the invention, Figure 3 is a schematic diagram of a suitable surface indicating means, and Figure 4 is a schematic circuit diagram of an oscillatory circuit which may satisfactorily be used in the apparatus.

Referring to the drawings, and particularly to Figure 1, the reference numeral 6 indicates generally the probe unit of the apparatus of the invention which includes the tubular housing 8 which may be lowered into the well bore by means of the cable 9. The housing may be formed of any suitable non-magnetic material.

A pair of permanent magnets 10 and 12 are located in the housing and are longitudinally spaced from one another. In this example of the invention, the unlike poles of the permanent magnets are placed adjacent the ends of a core 14, which may take the form of a rod, as illustrated. The core should be constructed of easily-saturable ferromagnetic material of high permeability, and, preferably, of a material which has a permeability which changes with small changes in the magnetic field of the two magnets 10 and 12. A satisfactory material for the purpose is known in the art as Croloy #70 as it is an easily saturable material of high permeability which changes with small changes in the field of the permanent magnets. Preferably, the core 14 is separated from the magnets 10 and 12 by means of the Bakelite discs 15, or other suitable material, so that the functioning of the core 14 is on the steep portion of the hysteresis curve thereby providing great sensitivity.

A coil 16 is disposed about the core 14, which coil is connected by the lead 18 to the oscillator 20 disposed in the upper portion of the housing 8. The coil 16 is grounded to the nonmagnetic case 8, as at 22, and the oscillator provides oscillating voltage to the coils 16, as will be apparent later.

In order to reduce absorption of the housing 8 of any electrostatic charge from the coil 16, an electrostatic shield 26 may be provided in the case 8 about the permanent magnets 10 and 12 and the core 14. In the event the electrostatic shield 26 is used, it may be spaced from the magnets 10 and 12 by means of the insulated spacers 28, and may be spaced and insulated from the case 8 by means of the insulated spacers 30, which spacers are provided at the upper and lower ends of the electrostatic shield 26. Thus, the electrostatic shield is maintained in spaced and insulated relation from the magnets 10 and 12, and core 14, and from the case 8. It is understood, however, that if desired, the electrostatic shield 26 may be omitted and satisfactory results have been obtained without using this shield.

The case 8 is closed at its lower end by means of the threaded pin 32, which has the downwardly-tapered portion at its lower end for readily moving it downwardly through well bores, strings of pipe and the like. For convenience, the lower closure pin member 32 is such that complete and ready access is obtainable to the interior of the case 8 by the removal of this member.

A similar closure member 31 is provided at the upper end of the case 8 and is threaded to the upper end to close the case thereby completely enclosing the oscillator, permanent magnets and easily saturable core so that there are no external windings and the like. The upper closure member 31 may take the form of a conventional cable connection to the cable 9 by which the instrument may be lowered in or raised from the well bore and, any conventional cable connection through which energizing voltage for the oscillator 20 may be utilized. These connections are conventional, and no detailed description thereof is deemed necessary.

As more readily apparent later, the permanent magnets 10 and 12 set up what might be called an external magnetic field and oscillating voltage supplied to the coil 16 saturates or nearly saturates the core 14 with magnetic flux so that slight changes in the external magnetic field changes the total magnetic field thereby distorting the output electromagnetomotive force of the coil 16, which distortion is indicated at the surface in a manner described later.

A modified form of the probe unit of the apparatus of the invention is illustrated in Figure 2, which differs from that of Figure 1 only in that the electrostatic shield 26 has been eliminated, and the polarity of permanent magnet 10 has been reversed, as at 10a to provide like poles at opposite ends of the core 14. The elimination of the electrostatic shield 26 permits elimination of the insulated spacer elements 28 and 30, and only the insulated spacer elements 30a are provided to space and insulate the permanent magnets 10a and 12a from the case 8. Other than the above, the modification of Figure 2 is the same as that of Figure 1 and the mode of operation is the same. In both cases, the permanent magnets 10 and 12, or 10a and 12a, provide a strong external magnetic field, the distortion of which by metallic objects causes the output electromagnetomotive force of the coil 16 to be distorted, which may instrumentally be read to indicate the presence and location of such metal defects, as will be apparent later.

It should be noted that while in Figure 1 the permanent magnets 10 and 12 are arranged so that the north pole is at the upper portion and the south pole is at the lower portion, and in Figure 2 the south poles are adjacent the core 14, that the poles may be reversed in each instance, in all of which arrangements a strong magnetic external field is provided satisfactory for the present purpose.

Referring to Figure 4, a satisfactory oscillator 20 is illustrated which includes the triode 21, the anode or plate of which is supplied positive potential by means of the electrical conductor 23 connected to the electrical conductor 36. The coil 16 is connected by the electrical conductor 18 to the grid of the triode 21 and the coil 16 is tapped to the plate of the triode 21 by means of the conductor 25. The coil 16 is grounded at 22 and the condensers 27 and 29 are arranged in parallel with the coil 16. The oscillator 20 is arranged with the resistance 31 in series with the filament, and the resistances 33 and 35 controlling the grid of the triode 21.

Any suitable oscillator may be utilized, and any type electron tube may be used, such as a triode, tetrode, pentode and the like, as desired.

The oscillator 20 may be energized by the direct current power source 40 which is connected by the electrical conductors 36 and 38 through the switch 41 to the oscillator 20. The direct power source may be provided at the surface which direct voltage is provided in the electrical conductors 36 and 38 in the cable 9 by which the instrument is lowered into and raised from the well bore. The tank or electronic circuit is inductively coupled to suitable indicating means by means of the primary coil 44 and the secondary coil 46, the latter being connected to the radio receiver 42. The radio receiver 42 is located on the surface and is of the conventional tuned-radio frequency type to which is connected a variable frequency oscillator 48 which is adapted to produce a beat frequency with the incoming signal from the tank circuit of the oscillator 20. A beat frequency of 50 or less to 1,000 or more cycles off the zero beat, that is, the frequency of the oscillator in the hole is satisfactory for the present purpose, although other beat frequencies may be used.

The radio frequencies are filtered by the conventional radio frequency filter 50, the beat frequency being connected to indicating or measuring means, such as the frequency meter 52, the vacuum tube volt meter 54 and the recorder or galvanometer 64. These elements are all conventional, are in widespread use and may be purchased commercially and no description thereof is deemed necessary. If desired, a conventional cathode ray oscilloscope 52 may be substituted in place of the arrangement described, and the conventional oscilloscope includes a beat frequency oscillator, is well known and no detailed description thereof is deemed necessary.

It is noted that the direct current power source, switch, receiver and associated indicating and measuring elements are all located on the surface by which the incoming signal is instrumentally noted in order to ascertain the presence of and locate metal objects in the well bore.

In operation, what may be termed the probe unit 6 is lowered into the well bore, not shown, by the cable 9 and direct current power is provided to the oscillator 20 by means of the electrical conductors 36 and 38 in the cable of the electrical conductors 36 and 38 in the cable 9. As a typical example, the beat frequency oscillator 48 was set 50 cycles off the zero beat of the oscillator 20 received by the radio receiver 42, and the frequency of the oscillator 20 was 30,000 cycles and the heterodyne frequency was 30,025 cycles.

As the probe unit 6 is lowered or raised in the well bore, the magnetic field of the permanent magnets 10 and 12 or 10a and 12a is applied to the easily-saturable ferromagnetic core 14 of high permeability, and as metal objects come within the external magnetic field, this magnetic field is distorted, which in turn distorts the magnetic field of the oscillator 20 radiated by the coil 16 which in turn distorts the output electromagnetomotive force of the coil which is received by the radio receiver 42. Thus, the frequency of the oscillator 20 in the tank circuit is changed. Since the oscillator tank circuit is inductively coupled to the radio receiver 42, its incoming signal is changed thereby changing the beat frequency at the surface of the earth, which is registered on the frequency meter or any of the other indicating or measuring means illustrated in Figure 3. As the probe unit nears the metallic object, the frequency of the oscillatory circuit is increasingly changed due to greater distortion of the field of the permanent magnets, which change in frequency will reach a maximum when the probe unit approaches the metallic object. For example, under the conditions set forth, the frequency of the oscillator began to shift when a six-foot piece of 2½ inch tubing was within eight feet of the first magnet. At the time the frequency begins to shift, or at the maximum change of frequency, or at any other desired point when the frequency is changing, the length of the cable 9 may be noted and the metallic object and its top exactly located in the well bore. Subsequent fishing operations may then be accomplished with enhanced chances of success in view of the fact the exact location of the object to be fished out of the well bore is known.

Numerous changes and rearrangement of parts in the apparatus of the invention will suggest themselves to those skilled in the art, and it is understood that any conventional oscillating circuit and oscillator and associated indicating instruments may be used.

It is, therefore, apparent that the apparatus of the present invention is well suited to carry out the objects of the invention and has the advantages mentioned and others incident thereto. It is also apparent that numerous changes in arrangement and details of the invention will readily suggest themselves to those skilled in the art, which are included within the spirit of the invention and the scope of the appended claims.

What is claimed is:

1. An apparatus for locating metal objects in a well bore comprising; a probe unit adapted to be introduced into the well bore and including at least one permanent magnet having a magnetic field directed externally of the apparatus and along the axis of the well bore, a highly permeable core carried by the probe unit and located in the external magnetic field, a coil disposed around the core, an oscillator providing oscillating voltage to the coil for saturating or partially saturating the core; means connected to the probe unit to move the probe unit in the well bore; and means at the surface of the earth associated with the oscillator to observe fluctuations in the frequency of the oscillator caused by disturbances of the external magnetic field by the presence in the field of the metal objects.

2. An apparatus for locating metal objects in a well bore comprising; a probe unit adapted to be introduced into the well bore and including a pair of permanent magnets having a magnetic field directed externally of the apparatus and along the axis of the well bore, a highly permeable core carried by the probe unit and disposed in the external magnetic field, a coil disposed about the core, an oscillator carried by the probe unit providing oscillating voltage to the coil for saturating or partially saturating the core; means connected to the probe unit for moving the probe unit in the well bore; and means at the surface of the earth associated with the oscillator to observe fluctuations in the frequency of the oscillator caused by distortion of the external magnetic field by the presence in the field of the metal objects.

3. An apparatus for locating metal objects in a well bore comprising; a probe unit adapted to be introduced into the well bore including means to produce an external magnetic field, a highly permeable core carried by the probe unit and disposed in the magnetic field, a coil disposed about the core, an electrostatic shield disposed around the first-mentioned means, core and coil, and an oscillator carried by the probe unit providing oscillating voltage to the coil producing a magnetic field about and saturating or partially saturating the core; means connected to the probe unit to move the probe unit in the well bore; and means at the surface associated with the oscillator to observe fluctuations in the frequency of the oscillator caused by distortion of the external magnetic field by the presence in the external magnetic field of the metal objects.

4. An apparatus for locating metal objects in a well bore comprising; a probe unit adapted to be introduced into the well bore and comprising a completely enclosed case of nonmagnetic material, a pair of permanent magnets disposed in the case providing an external magnetic field, a core of easily saturable magnetic material of high permeability disposed in the case and in the external magnetic field, a coil disposed about the core, an oscillator in the case providing oscillating voltage to the coil producing a magnetic field about the core and driving the core cyclically through saturation; means connected to the probe unit to move the probe unit in the well bore; and means at the surface associated with the circuit of the oscillator to observe fluctuations in the frequency of the oscillator, such disturbances caused by disturbances of the external magnetic field by the presence in the field of the metal objects distorting the output electromagnetomotive force of the coil.

5. Apparatus for locating metal objects in a well bore comprising; a probe unit adapted to be introduced into the well bore including a case of non-magnetic material, a pair of longitudinally-spaced magnets in the case producing an external magnetic field, a highly permeable core disposed in the case between the magnets and in the external magnetic field, a coil disposed about the core, an oscillator in the case providing oscillating voltage to the coil thereby producing a magnetic field about and saturating or partially saturating the core; a cable connected to the upper end of the case to lower and raise the probe unit in the well bore; and means at the surface to observe instrumentally fluctuations in the frequency of the circuit of the oscillator caused by distortion of the external magnetic field and thereby distortion of the output electromagnetomotive force of the coil by the presence in the external magnetic field of the metal objects, said last-mentioned means including a radio receiver and a beat frequency oscillator heterodyned to the frequency of the first-mentioned oscillator.

6. Apparatus for locating metal objects in a well bore comprising; a probe unit adapted to be introduced into the well bore including a case of nonmagnetic material, a pair of longitudinally-spaced magnets in the case producing an external magnetic field, a highly permeable core disposed in the case between the magnets and in the external magnetic field, a coil disposed about the core, an electrostatic shield disposed in spaced relation about the magnets, core and coil, an oscillator in the case providing oscillating voltage to the coil thereby producing a magnetic field about and saturating or partially saturating the core; a cable connected to the upper end of the case to lower and raise the probe unit in the well bore; and means at the surface to instrumentally observe fluctuations in the frequency of the circuit of the oscillator caused by distortion of the external magnetic field and thereby distortion of the output electro-magnetomotive force of the coil by the presence in the external magnetic field of the metal objects, said last-mentioned means including a radio receiver and a beat frequency oscillator heterodyned to the frequency of the first-mentioned oscillator.

7. An apparatus for locating metal objects in a well bore comprising; a probe unit adapted to be introduced into the well bore and including a case of nonmagnetic material enclosing the probe unit, a pair of axially-spaced permanent magnets in the case producing an external magnetic field, a highly permeable core disposed in the case between the magnets and in the external magnetic field, a coil disposed about the core, an electrostatic shield disposed about the permanent magnets, core and coil, first dielectric means spacing the electrostatic shield from the magnets, core and coil and second dielectric means spacing the electrostatic shield from the case, an oscillator disposed in the case and above the electrostatic shield providing an oscillating voltage to the coil; a cable connected to the upper end of the probe unit for raising and lowering the probe unit in the well bore; and means at the surface of the earth inductively coupled to the circuit of the oscillator to observe fluctuations in the frequency of the oscillator caused by disturbance of the external magnetic field by the presence in the external magnetic field of the metal objects, such last-mentioned means including an oscilloscope.

References Cited in the file of this patent

UNITED STATES PATENTS

| | | |
|---|---|---|
| 1,996,906 | DeLanty | Apr. 9, 1935 |
| 2,048,591 | Berry | July 21, 1936 |
| 2,393,717 | Speaker | Jan. 29, 1946 |
| 2,407,536 | Chapman | Sept. 10, 1946 |
| 2,480,265 | Rubenstein | Aug. 30, 1949 |
| 2,602,833 | Swift | July 8, 1952 |
| 2,671,275 | Burns | Mar. 9, 1954 |